US012673863B2

(12) United States Patent
Williams et al.

(10) Patent No.: US 12,673,863 B2
(45) Date of Patent: Jul. 7, 2026

(54) SYSTEM FOR MONITORING THE LIQUID LEVEL IN A MIXTURE OF A GAS AND A LIQUID COMPRISING TWO INTERMISCIBLE COMPONENTS HAVING DIFFERENT DENSITIES AND METHOD THEREOF

(71) Applicant: Yara International ASA, Oslo (NO)

(72) Inventors: Rebecca Sian Williams, Hvittingfoss (NO); Matej Halasa, Lessines (BE)

(73) Assignee: YARA INTERNATIONAL ASA, Oslo (NO)

( * ) Notice: Subject to any disclaimer, the term of this patent is extended or adjusted under 35 U.S.C. 154(b) by 131 days.

(21) Appl. No.: 18/710,395

(22) PCT Filed: Nov. 18, 2022

(86) PCT No.: PCT/EP2022/082374
§ 371 (c)(1),
(2) Date: May 15, 2024

(87) PCT Pub. No.: WO2023/089081
PCT Pub. Date: May 25, 2023

(65) Prior Publication Data
US 2025/0002327 A1 Jan. 2, 2025

(30) Foreign Application Priority Data
Nov. 19, 2021 (EP) .................................... 21209192

(51) Int. Cl.
*B67D 7/16* (2010.01)
*F17D 1/04* (2006.01)

(52) U.S. Cl.
CPC ................ *B67D 7/16* (2013.01); *F17D 1/04* (2013.01)

(58) Field of Classification Search
CPC .. B67D 7/16; F17D 1/04; C01B 21/26; G01F 23/0046; G01F 23/007; G01F 22/00; G01F 23/0007; G01F 23/02
See application file for complete search history.

(56) References Cited

U.S. PATENT DOCUMENTS 9,134,162 B2 * 9/2015 Taylor ..................... G01F 23/02
2006/0130572 A1 * 6/2006 Northrop ................ G01F 23/02 73/149
2013/0192680 A1 * 8/2013 Dziobek .................. G05D 9/00 137/386

FOREIGN PATENT DOCUMENTS

CN 202562557 U 11/2012
CN 203848568 U 9/2014
(Continued)

OTHER PUBLICATIONS

International Search Report and Written Opinion issued in App. No. PCT/EP2022/082374, dated Feb. 10, 2023, 13 pages.
(Continued)

*Primary Examiner* — Jason K Niesz
(74) *Attorney, Agent, or Firm* — Dilworth IP, LLC

(57) ABSTRACT

A system for containing a chemical mixture including a liquid with at least two intermiscible components having different densities, and a gas. The system includes a spherical reservoir, including top and bottom sections and a bottom; a vertically positioned standpipe having a top section in fluid communication with the top section of the spherical reservoir through a connection pipe, and a bottom section including a bottom, in fluid communication with the bottom section of the spherical reservoir through a connection pipe; a conduit for supplying the gas from the chemical mixture; and first and second draining pipes in fluid connection with the bottoms of the spherical reservoir; and of the standpipe, respectively. The bottom section of the stand-
(Continued)

Figure 1:
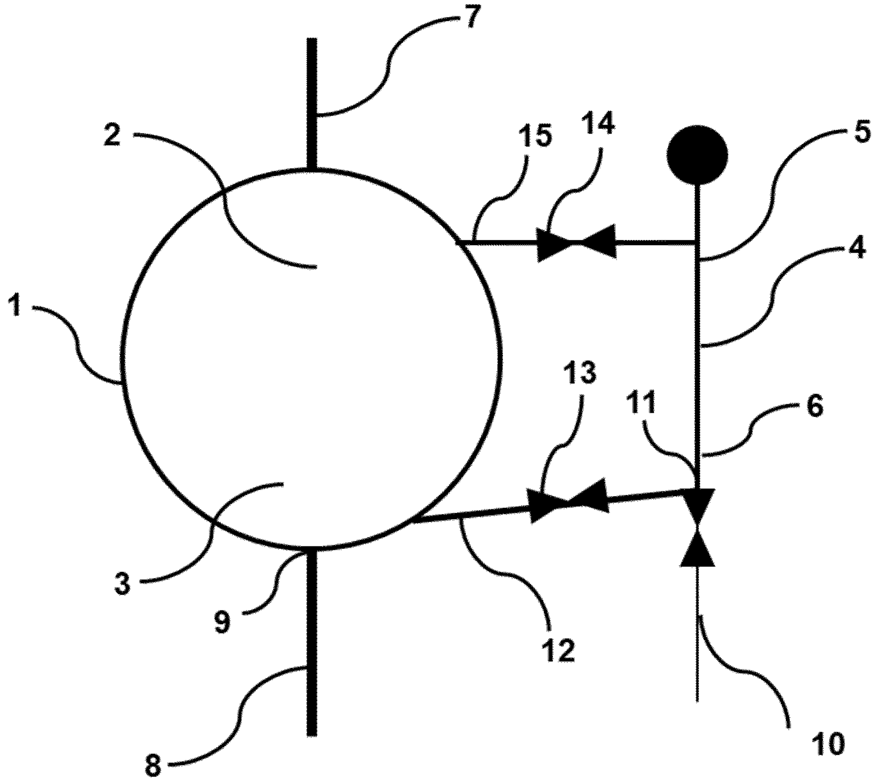

pipe is higher than the bottom section of the spherical reservoir, and the connection pipe is a downwardly-inclined pipe from the bottom section of the standpipe to the bottom section of the spherical reservoir.

15 Claims, 2 Drawing Sheets

(56) References Cited

FOREIGN PATENT DOCUMENTS

| | | | |
|---|---|---|---|
| CN | 104965048 | A | 10/2015 |
| CN | 211999578 | U | 11/2020 |
| RU | 2156637 | C2 | 9/2000 |
| RU | 2367498 | C2 | 9/2009 |
| RU | 182044 | U1 | 8/2018 |

OTHER PUBLICATIONS

Extended European Search Report issued in App. No. 21209192.0, dated May 11, 2022, 6 pages.
Search Report received for RU Application No. 2024112447, mailed on Mar. 25, 2026, 2 pages of English Translation Only.

* cited by examiner

SYSTEM FOR MONITORING THE LIQUID LEVEL IN A MIXTURE OF A GAS AND A LIQUID COMPRISING TWO INTERMISCIBLE COMPONENTS HAVING DIFFERENT DENSITIES AND METHOD THEREOF

FIELD OF THE INVENTION

The present disclosure relates to the field of liquid level monitoring in a mixture of a gas and a liquid comprising two intermiscible components having different densities.

BACKGROUND

Monitoring the liquid level in reservoirs is important in several aspect. Firstly, this is important to remain aware of the quantity of liquid being present in the reservoir, such that, if this liquid is to be used as a reagent in a production plant, the operator knows that there is a sufficient amount of the reagent available for production purposes. When then level reaches a so-called "lower-level limit" an alarm is given for the reservoir to be refilled.

In addition, when the liquid vaporizes in the container and it is the gas phase above the liquid that is to be used as the reagent in the chemical reaction, this is important to know that the liquid level is not too high, such that only the gas phase is transferred to the production unit. This can, for example, be the case when droplets of a liquid can cause safety issues in the production. For instance, in the production of nitric acid, if not only ammonia gas but droplets of liquid ammonia also containing water are transferred to the ammonia oxidation burner, this can result in the formation of explosive mixture of ammonia and air, with the amount of ammonia going above the low explosion limit: as it is the amount of gaseous and not liquid ammonia that is monitored in the ammonia oxidation burner, if liquid ammonia enters the burner, the amount of total ammonia no longer is properly monitored and become too high. This means that there is also a need for "an upper-level limit" to be monitored for the liquid in the reservoir: the liquid level must not be above this limit.

Traditionally, reservoirs for liquid are connected to so-called standpipes. Often, there are multiple elements in the reservoir, such as pipes in which a fluid for heat exchange is circulated, such that the liquid in the reservoir can be heated or cooled down. As a result, there is more space in the standpipe for measuring the liquid level and means for measuring the liquid level are more conveniently placed in the standpipe.

However, for the liquid level in the reservoir to correspond to the level in the standpipe, the phases in which the liquid co-exists in the reservoir and in the standpipe should be identical. This is not always the case as, in particular and for example, if the liquid comprises two miscible components of different densities and boiling temperatures, evaporation of one of those components may be observed to a different degree in the reservoir and in the standpipe. Consequently, the information regarding the level of liquid in the reservoir and in the standpipe is contradictory and this is no longer possible to know if the liquid level is no lower than the lower-level limit and not higher than the upper-level limit.

CN202562557U (China Gezhouba Group Co Ltd, 2012) for equalizing the liquid level in the reservoir and in the standpipe and for measuring the level of clean liquid ammonia separated from sewage. The utility model discloses a liquid level indicating device for a sewage discharge-type ammonia storage unit. It includes a liquid storage tank having its upper and lower ends communicating with a communication tube. A liquid level display tube is disposed at middle part of the communication tube. Two ends of the communication tube are provided with a first stop valve and a second stop valve. Two ends of the liquid level display tube are provided with a third stop valve and a fourth stop valve. A sewage discharge tube is disposed between the second stop valve and the fourth stop valve and provided thereon with a fifth stop valve. The liquid level indicating device for sewage discharge-type ammonia storage unit provided by the present utility model can discharge ammonia liquid in the liquid level display tube at any moment via the arranged sewage discharge tube, thereby preventing phenomena of fuzzy liquid level and low visibility due to sedimentation of refrigeration oil, increasing visibility of liquid level, and facilitating operator to view ammonia liquid in the liquid storage tank. At the same time, the arranged electromagnetic floating ball liquid level meter fulfills the function of automatic alarming when high and low limit liquid levels of the ammonia liquid in the ammonia storage tank are reached.

The utility model includes two draining point: one at the bottom of the liquid storage tank and one at the bottom of the communication tube.

Thereby, a goal of the present disclosure is to improve the draining system, in order to both ensure proper draining of the high-density liquid component, as well as to simplify the system and its functioning.

SUMMARY

In a first aspect of the disclosure, a system for containing a chemical mixture comprising a liquid comprising at least two intermiscible components having different densities, and a gas, is disclosed.

The system comprises:

- a spherical reservoir comprising a top section, a bottom section and a bottom;
- a vertically positioned standpipe having a top section in fluid communication with the top section of the spherical reservoir through a connection pipe, and a bottom section comprising a bottom, in fluid communication with the bottom section of the spherical reservoir through a connection pipe;
- a conduit in fluid communication with the top section of the spherical reservoir for supplying the gas from the chemical mixture;
- a first draining pipe in fluid connection with the bottom of the spherical reservoir; and
- a second draining pipe in fluid communication with the bottom of the standpipe;

The system is characterised in that the bottom section of the standpipe is higher than the bottom section of the spherical reservoir, and wherein the connection pipe is a downwardly-inclined pipe from the bottom section of the standpipe to the bottom section of the spherical reservoir.

In one embodiment according to the system of the disclosure, the angle between the downwardly-inclined pipe and the bottom section of the standpipe ranges from 60 to 89 degrees.

In one embodiment according to the system of the disclosure, the liquid is a liquid ammonia comprising from 0.01 to 0.5 weight % water.

In one embodiment according to the system of the disclosure, the system further comprises cooling coils around the standpipe.

In one embodiment according to the system of the disclosure, the fluid communication joining the bottom section of the standpipe and the bottom section of the spherical reservoir joins the bottom section of the spherical reservoir at the bottom of the reservoir.

In one embodiment according to the system of the disclosure, the standpipe is made of stainless steel.

In one embodiment according to the system of the disclosure, the system further comprises flow control valves in each of the connection pipes.

In one embodiment according to the system of the disclosure, each of the fluid communications between the standpipe and the spherical reservoir is free of valve.

In another aspect of the disclosure, a method for measuring the level of liquid. The method comprises the steps of:

a) providing a device according to the system of the disclosure further comprising a means for measuring the liquid level in the standpipe and for giving a signal when the measured level is below a low liquid level limit or above a high liquid level limit;

b) draining liquid at the bottom of the spherical reservoir through the first draining pipe or at the bottom of the standpipe through the second draining pipe, such as to achieve a similar phase in the liquid ammonia reservoir and in the standpipe; and c) reading the indications given by the liquid sensors.

In one embodiment according to the method of the disclosure, the method further comprises the step of:

d) heating the fluid in the reservoir, such as to evaporate the liquid in the spherical reservoir.

In one embodiment according to the method of the disclosure, the method further comprises the step of:

e) cooling the liquid in the standpipe such as to control the evaporation of the liquid in the standpipe.

In one embodiment according to the method of the disclosure, the method is performed in the system of the disclosure comprising flow control valves in each of the connection pipes and further comprises the step of:

f) opening the flow control valves in each of the fluid communications between the standpipe and the spherical reservoir.

In one embodiment according to the method of the disclosure, the method is performed in the system of the disclosure wherein each of the fluid communications between the standpipe and the spherical reservoir is free of valve and, in step b), draining of the liquid is only performed at the bottom of the spherical reservoir through the first draining pipe.

In one embodiment according to the method of the disclosure, the steps are performed in a batch or in a continuous manner.

In another aspect of the disclosure, the use of the system of the disclosure for performing the method of the disclosure is disclosed.

In another aspect of the disclosure, a method for revamping a system for containing a chemical mixture comprising a liquid with at least two miscible components having different densities and a gas, comprising:

a spherical reservoir comprising a top section, a bottom section and a bottom;

a vertically positioned standpipe having a top section in fluid communication with the top section of the spherical reservoir through a connection pipe, and a bottom section comprising a bottom, in fluid communication with the bottom section of the spherical reservoir through a connection pipe;

a conduit in fluid communication with the top section of the spherical reservoir for supplying the gas from the chemical mixture;

a first draining pipe in fluid connection with the bottom of the spherical reservoir; and a second draining pipe in fluid communication with the bottom of the standpipe; into a system according to the system of the disclosure, is disclosed. The method comprises the steps of:

positioning the bottom section of the standpipe at a higher level than the bottom section of the spherical reservoir; and inclining the connection pipe joining the bottom section of the standpipe to the bottom section of the spherical reservoir, thereby providing a downwardly-inclined pipe from the standpipe to the bottom section of the spherical reservoir.

LIST OF FIGURES

FIG. 1: schematic representation of the system of the disclosure, wherein the bottom 11 of the draining pipe 4 is connected to the bottom section 3 of the reservoir 1

Figure 2:
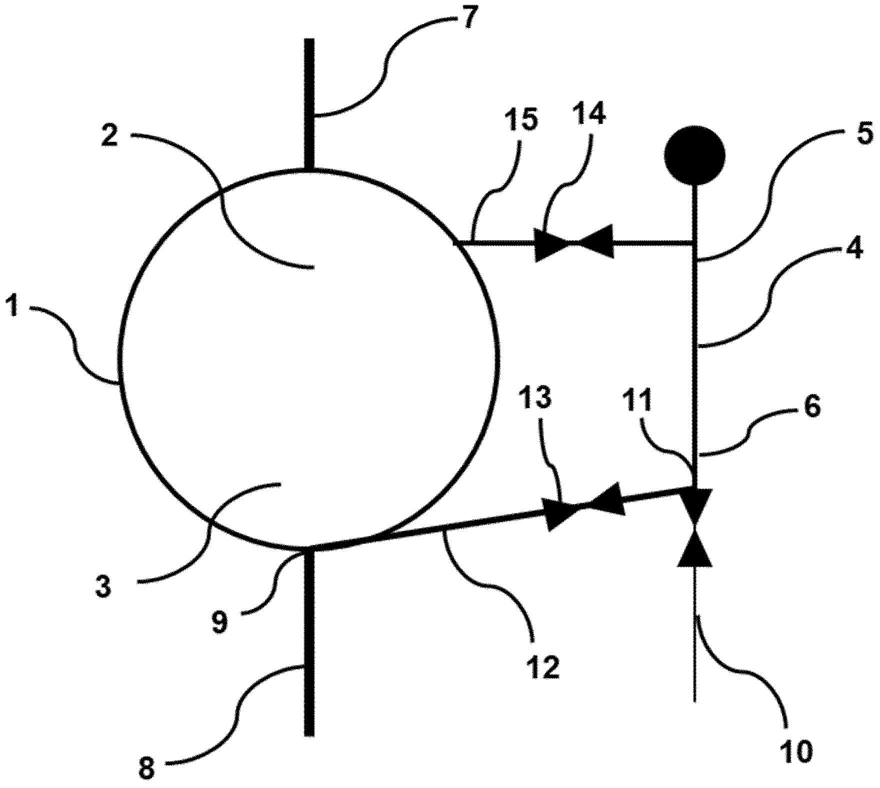

FIG. 2: schematic representation of the system of the disclosure, wherein the bottom 11 of the draining pipe 4 joins the bottom section 3 of the reservoir 1 at the bottom 9 of the reservoir 1

Table of numerals

| | |
|---|---|
| 1 | spherical container |
| 2 | top section of the spherical container 1 |
| 3 | bottom section of the spherical container 1 |
| 4 | standpipe |
| 5 | top section of the standpipe 4 |
| 6 | bottom section of the standpipe 4 |
| 7 | conduit for supplying gas |
| 8 | first draining pipe |
| 9 | bottom of the reservoir 1 |
| 10 | second draining pipe |
| 11 | bottom of the standpipe 4 |
| 12 | downwardly-inclined pipe (12) from the standpipe (4) to the bottom section (3) of the spherical reservoir (1) |
| 13 | flow control valve |
| 14 | flow control valve |
| 15 | connection pipe joining the top section 5 of the standpipe 4 and the top section 2 of the spherical reservoir 1 |

DETAILED DESCRIPTION

Throughout the description and claims of this specification, the words “comprise” and variations thereof mean “including but not limited to”, and they are not intended to (and do not) exclude other moieties, additives, components, integers or steps. Throughout the description and claims of this disclosure, the singular encompasses the plural unless the context otherwise requires. In particular, where the indefinite article is used, the disclosure is to be understood as contemplating plurality as well as singularity, unless the context requires otherwise.

Features, integers, characteristics, compounds, chemical moieties, or groups described in conjunction with a particular aspect, embodiment or example of the disclosure are to be understood to be applicable to any other aspect, embodiment or example described herein unless incompatible there-with. All features disclosed in this disclosure (including the description, claims, abstract and drawing), and/or all steps of any method or process so disclosed, may be combined in any combination, except combinations where at least some of such features and/or steps are mutually exclusive. The disclosure is not restricted to the details of any foregoing embodiments. The disclosure extends to any novel one, or any novel combination, of the features disclosed in this disclosure (including the description, claims, abstract and drawing), or to any novel one, or any novel combination, of the steps of any method or process so disclosed.

The enumeration of numeric values by means of ranges of figures comprises all values and fractions in these ranges, as well as the cited end points. The terms "in the ranges of" and "ranging from . . . to . . . " as used when referring to a range for a measurable value, such as a parameter, an amount, a time period, and the like, is intended to include the limits associated to the range that is disclosed.

As defined herein the top section of an object defines the upper part of this object and the bottom section of an object defined the lower part of this object.

As defined herein the bottom of an object defines the lowest point of this object. Hence, the bottom of an object is comprised in the lower section of the object.

As defined herein, a spherical container is a container, the bottom of which has a curved shape.

In a first aspect of the disclosure, a system for containing a chemical mixture comprising a liquid comprising at least two intermiscible components having different densities, and a gas, is disclosed. The system comprises a spherical reservoir 1 comprising a top section 2, a bottom section 3 and a bottom 9; a vertically positioned standpipe 4 having a top section 5 in fluid communication with the top section 2 of the spherical reservoir 1 through a connection pipe 15, and a bottom section 6 comprising a bottom 11, in fluid communication with the bottom section 3 of the spherical reservoir 1 through a connection pipe 12; a conduit 7 in fluid communication with the top section 2 of the spherical reservoir 1 for supplying the gas from the chemical mixture; a first draining pipe 8 in fluid connection with the bottom 9 of the spherical reservoir 1; and a second draining pipe 10 in fluid communication with the bottom 11 of the standpipe 4.

The system is characterised in that the bottom section 6 of the standpipe 4 is higher than the bottom section 3 of the spherical reservoir 1, and wherein the connection pipe 12 is a downwardly-inclined pipe from the bottom section 6 of the standpipe 4 to the bottom section 3 of the spherical reservoir 1.

When the system comprises a downwardly-inclined pipe in connection with the bottom section 3 of the spherical container 1, the content of the bottom 3 of the standpipe 4 is, at least partly, returned to the bottom section 3 of the spherical container 1. Therefore, considering the draining pipe 8 also in the bottom section 3 of the spherical container 1, at least part of the denser liquid in the standpipe is drained without having to use the second draining pipe 10 of the standpipe 4. Thereby, less dense liquid accumulates at the bottom of the standpipe 4 and any difference in the liquid level in the standpipe 4 and in the spherical container 1 is reduced.

The person skilled in the art will understand that the spherical container can be equipped with heat exchange devices such as heat exchange coils, in order to control the equilibrium between the liquid and the gas phase. For example, the evaporator can be equipped with heating coils, through which water, at about the vaporisation temperature of the liquid, is circulated.

In one embodiment according to the system of the disclosure, the angle between the downwardly-inclined pipe 12 and the bottom section 6 of the standpipe 4 ranges from 60 to 89 degrees.

When the angle between the downwardly-inclined pipe 12 and the bottom section 6 of the standpipe 4 is lower than 60 degrees, the operation of the manual valve in the standpipe 4 in order to perform draining through the second draining pipe 10 becomes more difficult due to the proximity of such valve with the standpipe 4. When the angle between the downwardly-inclined pipe 12 and the bottom section 6 of the standpipe 4 is higher than 89 degrees, the inclination is not sufficient for the liquid in the standpipe 4 to be returned to the container 1 and drained through the first draining pipe 8, at the bottom 9 of the reservoir 1, such that no draining has to be performed through the second draining pipe 10, while the system is operated.

In one embodiment according to the system of the disclosure, the liquid is liquid ammonia comprising from 0.01 to 0.5 weight % water.

The system of the disclosure is particularly suitable in case the mixture is in the spherical container 1 is a mixture comprising liquid ammonia comprising 0.01 to 0.5 weight % water and gaseous ammonia. The problem the disclosure intends to address has indeed been found particularly to occur using such mixture: the level of liquid ammonia in the spherical container 1 and the standpipe 4 differed and, consequently, it could not be assessed whether there was a sufficient amount of liquid ammonia for being oxidized in an ammonia oxidation burner, and whether the level of liquid ammonia was not too high such as to prevent unwanted droplets of aqueous liquid ammonia to be directed to the ammonia oxidation burner.

In one embodiment according to the system of the disclosure, the system further comprises cooling coils around the standpipe 4.

Under temperatures at which the liquid evaporates, the level of liquid is difficult to control in the standpipe 4. Indeed, the volume in the standpipe is much smaller, so it will be more susceptible to evaporation than the bigger volume in the sphere. Evaporation can, for example, happen during Summertime, when the weather is warmer. Hence, in order to retain control on the equilibrium between the liquid phase and the gas phase in the standpipe, the presence of cooling coils around the standpipe 4 can be beneficial.

In one embodiment according to the system of the disclosure, the fluid communication 12 joining the bottom section 6 of the standpipe 4 and the bottom section 3 of the spherical reservoir 1 joins the bottom section 2 of the spherical reservoir 1 at the bottom 9 of the reservoir 1.

When the standpipe 4 and the bottom section 3 of the spherical reservoir 1 joins the bottom section 2 of the spherical reservoir 1 at the bottom 9 of the reservoir 1, denser liquid at the bottom 6 of the standpipe 4 is even more efficiently drained, which results in the problem of different phases in the standpipe 4 and in the spherical container 1 being solved more efficiently.

In one embodiment according to the system of the disclosure, the standpipe 4 is made of stainless steel.

The system of the disclosure is especially suitable for systems the standpipe of which is made of a material which avoids evaporation of the lighter component in the liquid and, thereby, the condensation of the heavier component at the bottom 6 of the standpipe 4. Such materials include but are not limited to stainless steel.

In one embodiment according to the system of the disclosure, the system further comprises flow control valves 13, 14 in each of the connection pipes 12, 15.

The presence of flow control valves allows for the control of the amount of the mixture that is stored in the standpipe 4. Hence, the amount of the mixture, as well as the actual volume retained in the standpipe 4 can be controlled in order to retain control on the equilibrium between the liquid phase and the gas phase in the standpipe 4, thereby controlling the degree to which a denser phase forms at the bottom 6 of the standpipe 4.

In one embodiment according to the system of the disclosure, each of the fluid communications between the standpipe 4 and the spherical reservoir 1 is free of valve.

It can be beneficial as well to have no separation between the spherical container 1 and the standpipe 4. In the case that there are no valves in the fluid communications between the standpipe 4 and the spherical reservoir 1 is free of valve, the content of the bottom 3 of the standpipe 4 is, at least partly, returned to the bottom section 3 of the spherical container 1. Therefore, considering the draining pipe 8 also in the bottom section 3 of the spherical container 1, at least part of the denser liquid in the standpipe is drained without having to use the second draining pipe 10 of the standpipe 4. Thereby, less dense liquid accumulates at the bottom of the standpipe 4 and any difference in the liquid level in the standpipe 4 and in the spherical container 1 is reduced.

In another aspect of the disclosure, a method for measuring the level of liquid is disclosed. The method comprises the steps of a) providing a device according to the system of the disclosure and further comprising means for measuring the liquid level in the standpipe and for giving a signal when the measured level is below a low liquid level limit or above a high liquid level limit; b) draining liquid at the bottom 9 of the spherical reservoir 1 through the first draining pipe 8 or at the bottom 11 of the standpipe 4 through the second draining pipe 10, such as to achieve a similar phase in the liquid ammonia reservoir 1 and in the standpipe 4; and c) reading the indications given by the liquid sensors.

When the system comprises a downwardly-inclined pipe in connection with the bottom section 3 of the spherical container 1, the content of the bottom 3 of the standpipe 4 is, at least partly, returned to the bottom section 3 of the spherical container 1. Therefore, considering the draining pipe 8 also in the bottom section 3 of the spherical container 1, at least part of the denser liquid in the standpipe 4 is drained without having to use the second draining pipe 10 of the standpipe 4. Thereby, less dense liquid accumulates at the bottom of the standpipe 4 and any difference in the liquid level in the standpipe 4 and in the spherical container 1 is reduced.

In one embodiment according to the method of the disclosure, the method further comprises the step of d) heating the fluid in the spherical reservoir 1, such as to evaporate the liquid in the spherical reservoir 1.

The person skilled in the art will understand that heat can be exchanged between the mixture in the spherical container and an external medium in heat exchange devices such as heat exchange coils, in order to control the equilibrium between the liquid and the gas phase. For example, the evaporator can be equipped with heating coils, through which water, at about the vaporisation temperature of the liquid, is circulated.

In one embodiment according to the method of the disclosure, the method further comprises the step of e) cooling the liquid in the standpipe 4 such as to control the evaporation of the liquid in the standpipe 4.

Under temperatures at which the liquid evaporates, the level of liquid is difficult to control in the standpipe 4. Indeed, the volume in the standpipe is much smaller, so it will be more susceptible to evaporation than the bigger volume in the sphere. Evaporation can, for example, happen during Summertime, when the weather is warmer. Hence, in order to retain control on the equilibrium between the liquid phase and the gas phase in the standpipe, cooling of the mixture in the standpipe 4 can be beneficial.

In one embodiment according to the method of the disclosure, the method is performed in the system of the disclosure comprising flow control valves 13, 14 in each of the connection pipes 12, 15, and further comprises the step of f) opening the flow control valves 13, 14 in each of the fluid communications between the connection pipes 12, 15.

The opening of flow control valves allows for the control of the amount of the mixture that is stored in the standpipe 4. Hence, the amount of the mixture, as well as the actual volume retained in the standpipe 4 can be controlled in order to retain control on the equilibrium between the liquid phase and the gas phase in the standpipe 4, thereby controlling the degree to which a denser phase forms at the bottom 6 of the standpipe 4.

In one embodiment according to the method of the disclosure, the method is performed in the system of the disclosure wherein each of the fluid communications 12, 15 between the standpipe 4 and the spherical reservoir 1 is free of valve and, in step b), draining of the liquid is only performed at the bottom 3 of the spherical reservoir 1 through the first draining pipe 8.

It can be beneficial as well to have no separation between the spherical container 1 and the standpipe 4. In the case that there are no valves in the fluid communications between the standpipe 4 and the spherical reservoir 1 is free of valve, the content of the bottom 3 of the standpipe 4 is, at least partly, returned to the bottom section 3 of the spherical container 1. Therefore, considering the draining pipe 8 also in the bottom section 3 of the spherical container 1, at least part of the denser liquid in the standpipe 4 is drained without having to use the second draining pipe 10 of the standpipe 4. Thereby, less dense liquid accumulates at the bottom of the standpipe 4 and any difference in the liquid level in the standpipe 4 and in the spherical container 1 is reduced.

In one embodiment according to the method of the disclosure, the steps are performed in a batch or in a continuous manner.

In another aspect of the disclosure, the use of the system of the disclosure for performing the method of the disclosure is disclosed.

In another aspect of the disclosure, a method for revamping a system for containing a chemical mixture comprising a liquid with at least two miscible components having different densities and a gas, comprising a spherical reservoir 1 comprising a top section 2, a bottom section 3 and a bottom 9; a vertically positioned standpipe 4 having a top section 5 in fluid communication with the top section 2 of the spherical reservoir 1 through a connection pipe 15, and a bottom section 6 comprising a bottom 11, in fluid communication with the bottom section 3 of the spherical reservoir 1 through a connection pipe 12; a conduit 7 in fluid communication with the top section 2 of the spherical reservoir 1 for supplying the gas from the chemical mixture; a first draining pipe 8 in fluid connection with the bottom 9 of the spherical reservoir 1; and a second draining pipe 10 in fluid communication with the bottom 11 of the standpipe 4; into a system according to the system of the disclosure, is disclosed. The method comprises the steps of inclining the connection pipe 12 joining the bottom section 6 of the standpipe 4 to the bottom section 3 of the spherical reservoir 1, thereby providing a downwardly-inclined pipe 12 from the standpipe 4 to the bottom section 3 of the spherical reservoir 1.

EXAMPLE

Liquid ammonia comprising 0.5% water was evaporated at a temperature of 12° C. in an evaporating system. According to the drawing depicted in FIG. 2, the evaporating system comprised:

- a spherical reservoir 1 comprising a top section 2, a bottom section 3 and a bottom 9;
- a vertically positioned standpipe 4 having a top section 5 in fluid communication with the top section 2 of the spherical reservoir 1 through a connection pipe 15, and a bottom section 6 comprising a bottom 11, in fluid communication with the bottom section 3 of the spherical reservoir 1 through a connection pipe 12;
- a conduit 7 in fluid communication with the top section 2 of the spherical reservoir 1 for supplying the gas from the chemical mixture;
- a first draining pipe 8 in fluid connection with the bottom 9 of the spherical reservoir 1; and
- a second draining pipe 10 in fluid communication with the bottom 11 of the standpipe 4.

The bottom section 2 of the standpipe 4 was higher than the bottom section 3 of the spherical reservoir 1 and the downwardly-inclined connection pipe 12 joined the bottom section 6 of the standpipe 4 to the bottom section 9 of the spherical reservoir 1.

The level of liquid ammonia in the reservoir 1 was monitored in each of the standpipe 4 and the reservoir 1, through liquid level sensors. A liquid sensor was placed in each the spherical reservoir 1 and in the standpipe 4 and could detect both a low liquid level limit and a high liquid level limit. The denser liquid in the reservoir 1 was drained through the first draining pipe 9. The valves 13 and 14 were left open in order to allow the content in the reservoir 1 and in the standpipe 4 to freely circulate between the reservoir 1 and the standpipe 4.

Due to the configuration of the evaporating system, most of the denser liquid in the standpipe 4 was directed in the bottom section of the reservoir 1 and drained through the draining pipe 9. Draining, as necessary was also performed through the second draining pipe 10, in order to remove any denser liquid accumulated at the bottom of the standpipe 4 and not drained through the first draining pipe 9.

The level of liquid in the reservoir 1 corresponded to the level of liquid observed and measured in the standpipe 4. Hence, it could be confidently concluded that the measured liquid level was correct and neither too low, meaning the reservoir 1 contained sufficient liquid ammonia, nor too high, meaning that no droplets of aqueous ammonia could be introduced in the ammonia oxidation burner (not shown) to which the gaseous ammonia exiting the conduit 7 was directed. Therefore, gaseous ammonia could be safely converted to nitric oxide in the ammonia oxidation burner.

The invention claimed is:

1. A system for containing a chemical mixture comprising a liquid comprising at least two intermiscible components having different densities, and a gas, comprising:

- a spherical reservoir comprising a top section, a bottom section and a bottom;
- a vertically positioned standpipe having a top section in fluid communication with the top section of the spherical reservoir through a connection pipe, and a bottom section comprising a bottom, in fluid communication with the bottom section of the spherical reservoir through a connection pipe;
- a conduit in fluid communication with the top section of the spherical reservoir for supplying the gas from the chemical mixture;
- a first draining pipe in fluid connection with the bottom of the spherical reservoir; and
- a second draining pipe in fluid communication with the bottom of the standpipe; wherein the bottom section of the standpipe is higher than the bottom section of the spherical reservoir, and wherein the connection pipe is a downwardly-inclined pipe from the bottom section of the standpipe to the bottom section of the spherical reservoir.

2. The system according to claim 1, wherein an angle between the downwardly-inclined pipe and the bottom section of the standpipe ranges from 60 to 89 degrees.

3. The system according to claim 1, wherein the liquid is a liquid ammonia comprising from 0.01 to 0.5 weight % water.

4. The system according to claim 1, further comprising cooling coils around the standpipe.

5. The system according to claim 1, wherein the fluid communication joining the bottom section of the standpipe and the bottom section of the spherical reservoir joins the bottom section of the spherical reservoir at the bottom of the reservoir.

6. The system according to claim 1, wherein the standpipe is made of stainless steel.

7. The system according to claim 1, further comprising flow control valves in each of the connection pipes.

8. The system according to claim 1, wherein each of the fluid communications between the standpipe and the spherical reservoir is free of valve.

9. A method for measuring a level of liquid, comprising steps of:

a) providing a device according to claim 1 and further comprising liquid sensors for measuring the liquid level in the standpipe and for giving a signal when the measured level is below a low liquid level limit or above a high liquid level limit;

b) draining liquid at the bottom of the spherical reservoir through the first draining pipe or at the bottom of the standpipe through the second draining pipe, such as to achieve a similar phase in the reservoir and in the standpipe; and c) reading indications given by the liquid sensors.

10. The method according to claim 9, wherein each of the fluid communications between the standpipe and the spherical reservoir is free of valve, wherein in step b), draining of the liquid is only performed at the bottom of the spherical reservoir through the first draining pipe.

11. The method according to claim 9, wherein the steps are performed in a batch or in a continuous manner.

12. The method according to claim 9, further comprising the step of:

d) heating the fluid in the spherical reservoir, such as to evaporate the liquid in the spherical reservoir.

13. The method according to claim 12, further comprising the step of:

e) cooling the liquid in the standpipe such as to control the evaporation of the liquid in the standpipe.

14. The method according to claim 13, wherein the device further comprises flow control valves in each of the connection pipes, further comprising the step of:

f) opening the flow control valves in each of the connection pipes.

15. A method comprising:

providing a spherical reservoir comprising a top section, a bottom section and a bottom;

providing a vertically positioned standpipe having a top section in fluid communication with the top section of the spherical reservoir through a connection pipe, and a bottom section comprising a bottom, in fluid communication with the bottom section of the spherical reservoir through a connection pipe;

providing a conduit in fluid communication with the top section of the spherical reservoir for supplying the gas from the chemical mixture;

providing a first draining pipe in fluid connection with the bottom of the spherical reservoir; and providing a second draining pipe in fluid communication with the bottom of the standpipe; into a system according to claim 1 for containing a chemical mixture comprising a liquid with at least two miscible components having different densities and a gas, the method further comprising the steps of:

positioning the bottom section of the standpipe at a higher level than the bottom section of the spherical reservoir; and inclining the connection pipe joining the bottom section of the standpipe to the bottom section of the spherical reservoir, thereby providing a downwardly-inclined pipe from the standpipe to the bottom section of the spherical reservoir.

* * * * *